United States Patent [19]

Uchida

[11] Patent Number: 5,014,805

[45] Date of Patent: May 14, 1991

[54] SNOW VEHICLE

[75] Inventor: Hiroyuki Uchida, Torrance, Calif.

[73] Assignee: Honda Giken Kogyo Kabushiki Kaisha, Tokyo, Japan

[21] Appl. No.: 422,806

[22] Filed: Oct. 17, 1989

[51] Int. Cl.⁵ .......................................... B62B 19/00
[52] U.S. Cl. .................................... 180/184; 180/192
[58] Field of Search ............... 180/182, 184, 190, 192; 280/21.1

[56] References Cited

U.S. PATENT DOCUMENTS 3,369,624 2/1968 Kauffmann ..................... 180/184 X
3,550,707 12/1970 Lange ................................ 180/190
3,877,536 4/1975 Earhart ......................... 180/182 X Primary Examiner—Charles A. Marmor
Assistant Examiner—Alan M. Kagen
Attorney, Agent, or Firm—Lyon & Lyon

[57] ABSTRACT

A snow vehicle having a frame, a body, a windscreen on the frame, two front steerable skis and two rear crawler tracks. An engine and drive train are located at the rear for driving both of the tracks. The drive train includes two fluid couplings, each coupling a crawler track, respectively. Two seats are positioned forwardly of the engine at the intersection of two lines seen in plan to extend from the geometric centers of front skis to the geometric center of opposite rear crawler tracks. A steering ski is located between the rear crawler tracks and extends downwardly just below the lower surfaces of the tracks. The ski is mounted to the crawler track suspension and pivots about a substantially vertical axis in a direction opposite to the motion of the front skis.

18 Claims, 4 Drawing Sheets

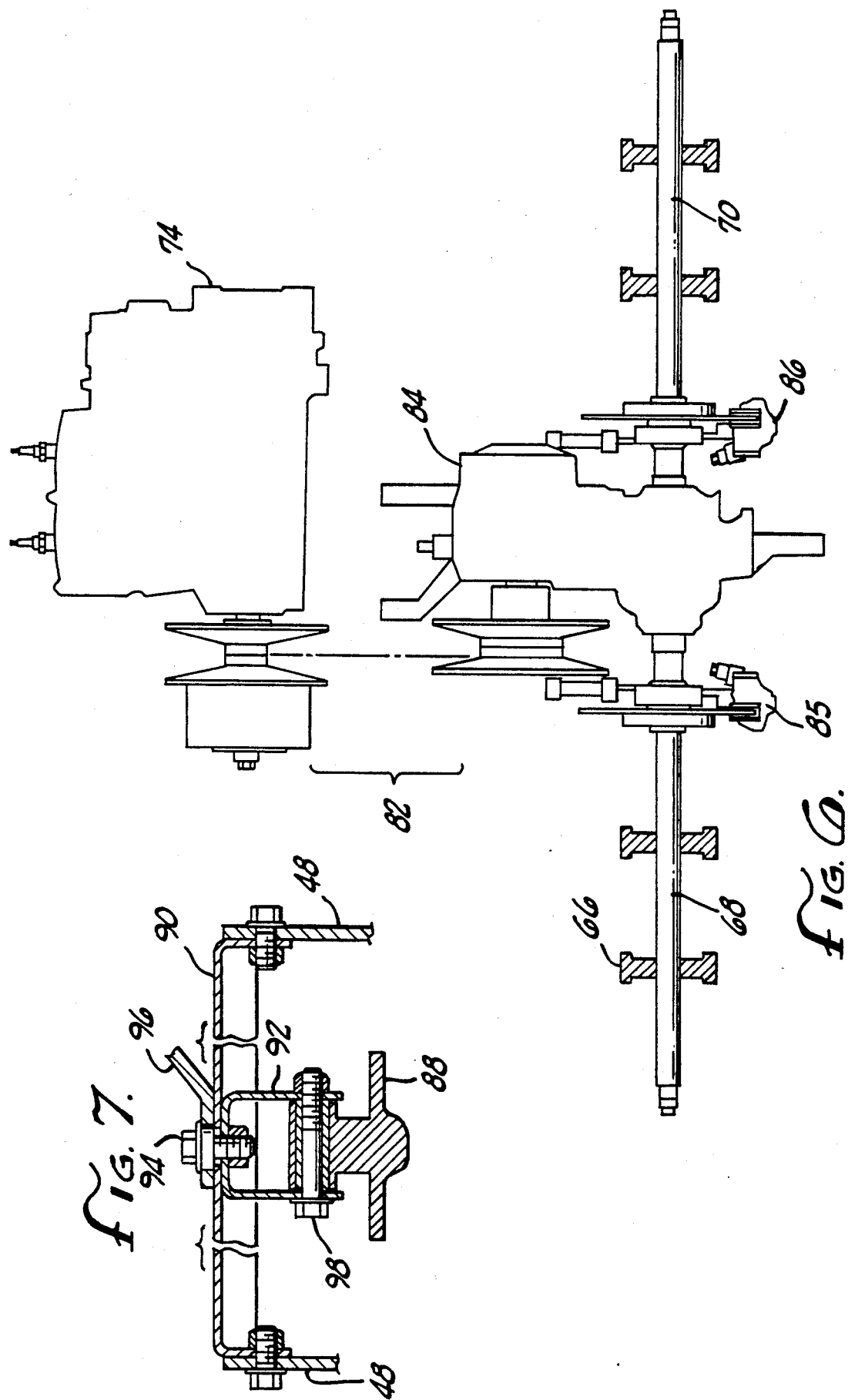

SNOW VEHICLE

BACKGROUND OF THE INVENTION

The field of the present invention is medium duty snow vehicles.

Snow vehicles have long been employed which have a frame, two skis in front for steering and support and two crawler tracks in back for motive force. A number of body styles have been contemplated based on design choice and intended utility. Vehicles for the snow have typically been relatively large and expensive to satisfy multiple utilitarian uses or configured in a straddle type vehicle, commonly referred to as a snowmobile, intended for fun, light duty use.

Because of the nature of the medium on which the vehicle is intended to travel, steering and control can be difficult. Because such devices are used in a variety of terrains, vehicle stability is also of importance. A need is understood to exist for a medium duty snow vehicle having conventional seats which is easily controlled, stable and priced reasonably.

SUMMARY OF THE INVENTION

The present invention is directed to a vehicle for use in snow which is comparatively easily controlled and stable.

In a first aspect of the present invention, a steering ski is pivotally mounted to the frame between the crawler tracks. This ski is steerable to provide increased control in operation.

In another aspect of the present invention, the location of the ski is geometrically centered between the crawler tracks and is positioned slightly below the bottom surface of the tracks to insure a positive force for control in snow. The front skis of the vehicle are also steerable and the steering ski may be coupled therewith through a steering mechanism which causes the steering ski to rotate in the opposite direction to that of the forward skis. A limited slip differential effect may be achieved to assist in control through dual fluid couplings, each associated with an axle shaft of the drive to the crawler tracks.

In further aspects of the present invention, the arrangement of components on the vehicle includes seats centrally located, an engine mounted behind the seats and extending to between the crawler tracks and a forwardly positioned fuel tank.

Accordingly, an object of the present invention is to provide a moderate duty snow vehicle having substantial control and stability at a reasonable cost. Other and further objects and advantages will appear hereinafter.

BRIEF DESCRIPTION OF THE DRAWINGS

FIG. 5 is a side view of the suspension system associated with the crawler tracks.

FIG. 6 is a layout view of the drive train of the present invention.

FIG. 7 is a cross-sectional view of the steering ski and the mounting therefor.

DETAILED DESCRIPTION OF THE PREFERRED EMBODIMENT

Figure 1:
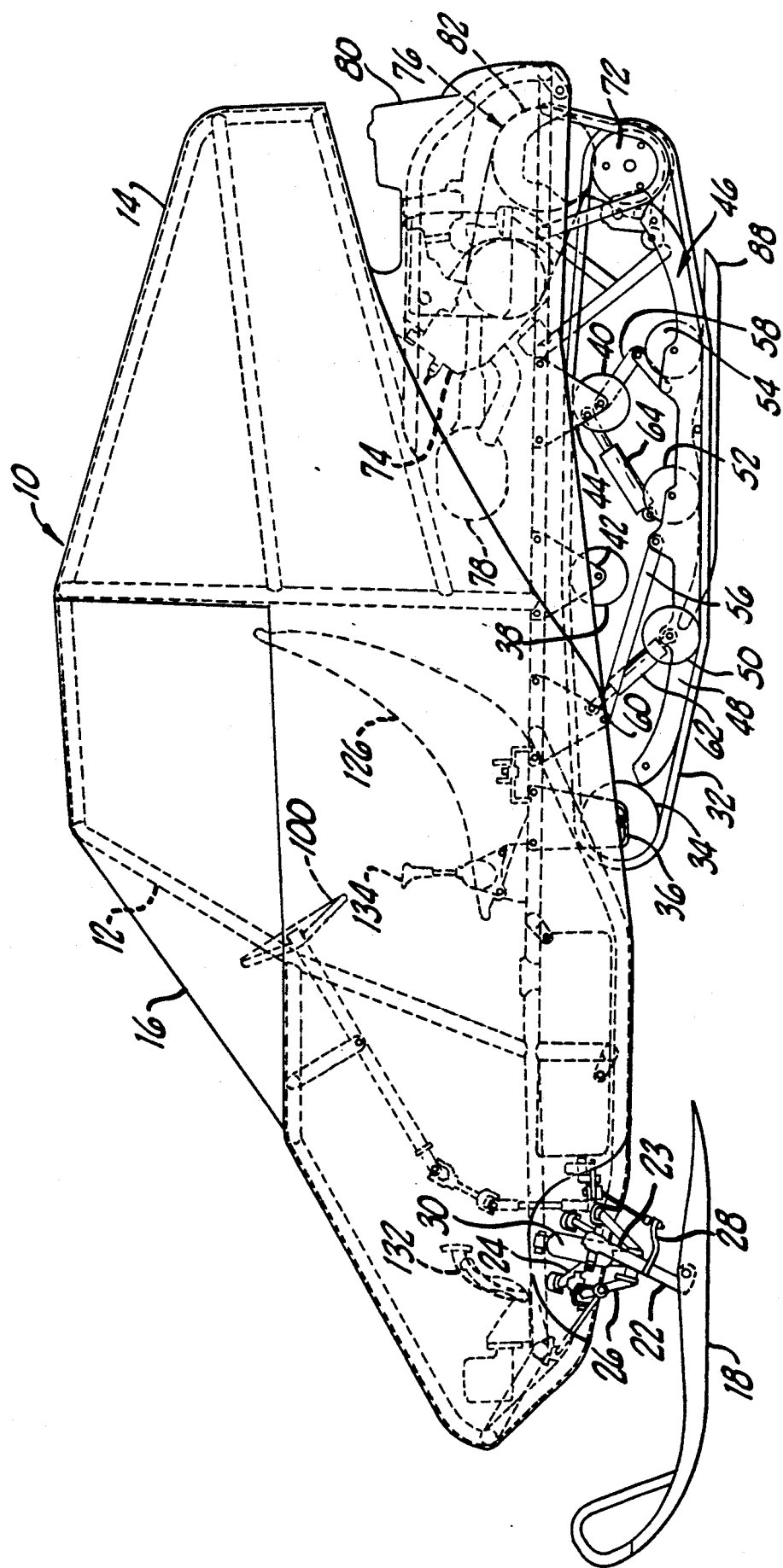
FIG. 1 is a side elevation of a snow vehicle of the present invention.

Turning in detail to the drawings, a snow vehicle, generally designated 10, is disclosed as having a tubular frame 12 and a light duty shell 14. A clear plastic wind screen 16 is also provided.

Two skis 18 and 20 are steerably mounted to the frame 12 at the forward end of the vehicle. Each ski 18 and 20 is mounted to a strut 22. The skis 18 and 20 pivot about a horizontal axis on each strut 22 but are retained to rotate with the strut about its long axis. The struts 22 are mounted though a suspension yoke 23 to upper and lower swing arms 24 and 26 such that the struts 22 pivot relative thereto under the direction of a steering arm 28. The suspension for each ski 18 and 20 is biased by a cushion element 30 fixed at one end to the lower swing arm 26 and to the frame at its upper end.

Rear support for the snow vehicle 10 is provided by crawler tracks 32. Two such crawler tracks are employed, arranged to either side of the vehicle such that they track behind the skis 18 and 20. Each crawler track 32 is mounted to the frame by means of wheels or rollers. Two front rollers 34 are spaced apart toward the edge of each crawler track 32. These rollers are rotatably mounted about a shaft fixed to the frame 12 at either end by front roller brackets 36. Additional rollers 38 and 40 are located to guide the upper extent of the crawler tracks 32. These rollers 38 and 40 are similarly rotatably mounted to the frame 12 by means of brackets 42 and 44.

Crawler track suspension assemblies, generally designated 46, include a suspended frame structure 48 to which are rotatably mounted rollers 50, 52 and 54. The frame structure 48 is mounted to move up and down relative to the frame 12 as allowed by swing arms 56 and linkages 58. These elements are pivotally mounted to the frame on brackets 60 and 44. Cushion members 62 and 64 bias each suspension system 46 downwardly.

The crawler tracks 32 are mounted at their rear extent by drive rollers 66. The drive rollers 66 are mounted to axles 68 and 70 as best seen in FIG. 6. The axles are mounted at their outer extent to brackets 72 which are fixed to the frame 12.

The power train of the snow vehicle 10 includes an engine 74 and a drive train, generally designated 76. The engine includes a muffler system 78 and an air cleaner and carburetion system 80. The engine is located above the crawler tracks 32 on the frame 12. The crawler tracks 32 are generally outwardly of the engine position. The drive train 76 includes a variable speed belt and pulley system 82 between the engine and a gear case 84. The gear case 84 preferably includes a forward and reverse transmission, a clutch and two fluid clutches. The fluid clutches are associated with each axle 68 and 70. In this way, the effect of a limited slip differential is achieved. Disc brakes 84 and 86 are also mounted to brake the axles 68 and 70.

Located between the crawler tracks 32 is a steering ski 88. The steering ski is located in plan at approximately the geometric center of the crawler tracks 32. The steering ski 88 extends down slightly below the crawler tracks 32 as can best be seen in FIG. 1. The steering ski is mounted to the frame 12 through the crawler track suspension assemblies 46. This mounting is best illustrated in FIG. 7. A mounting bar 90 extends laterally across the vehicle between suspended frame structure elements 48. A mounting bracket 92 is pivotally mounted relative to the mounting bar 90 by the pivot 94. The pivot 94 is controlled by a steering arm 96. Mounted to the mounting bracket 92 is a second pivot assembly 98 by which the steering ski 88 is pivotally mounted to the pivot assembly 98 about a horizontal axis.

Figure 2:
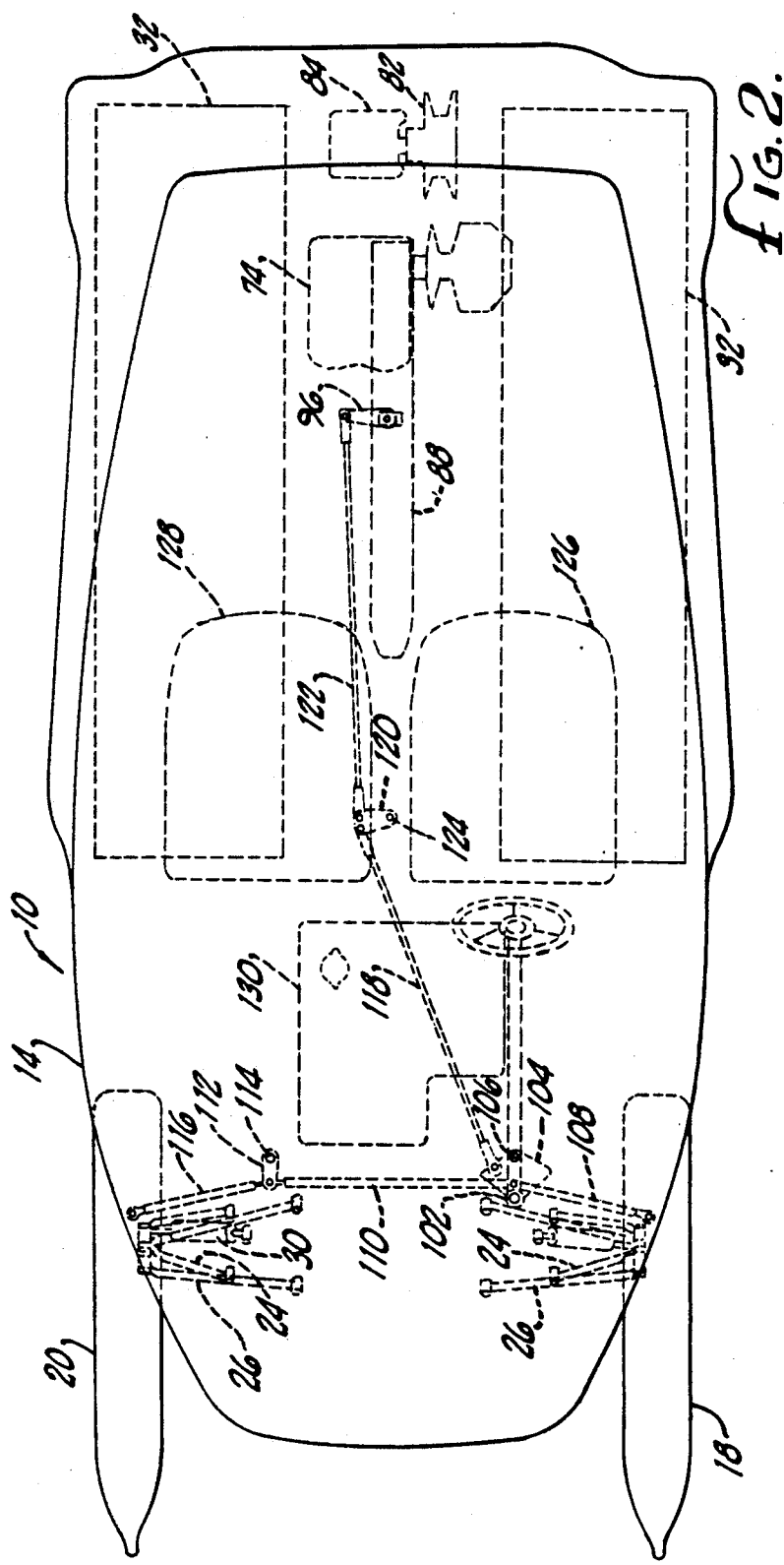
FIG. 2 is a plan view of a vehicle of the present invention.
Figure 3:
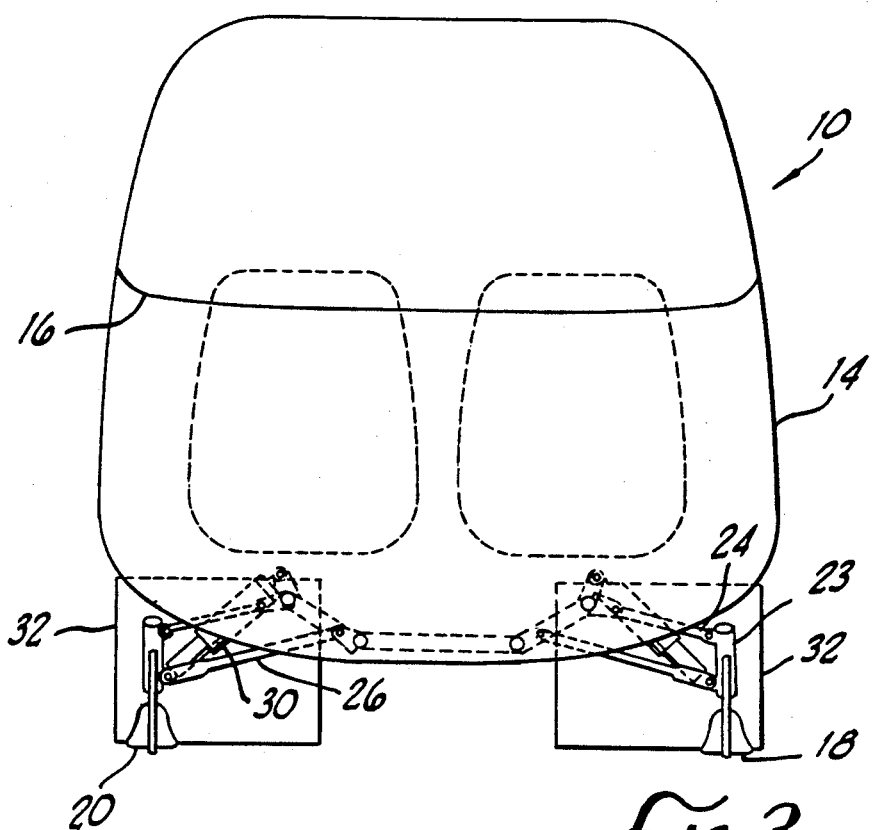
FIG. 3 is a front view of a vehicle of the present invention.
Figure 4:
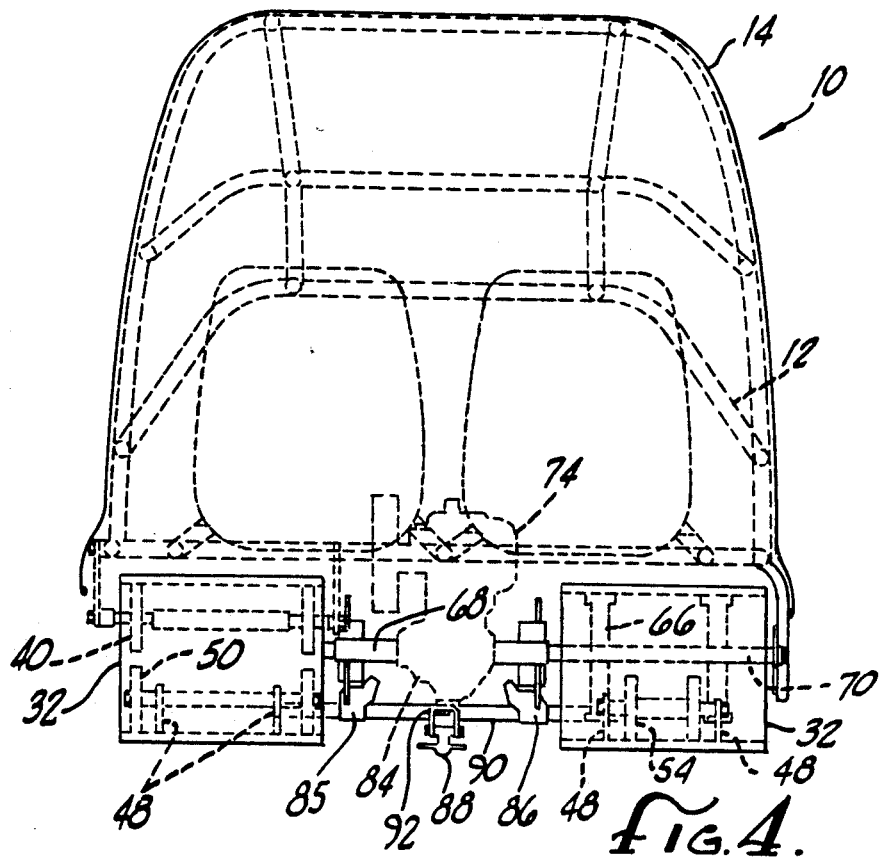
FIG. 4 is a rear view of a vehicle of the present invention.

Steering linkage is employed for control of the vehicle. A steering wheel 100 is coupled to a gear 102 that engages an arcuate rack 104. The arcuate rack is pivotally mounted at pivot 106. Associated with the arcuate rack 104 is a first steering link 108 which extends to the steering arm 28 on the left side of the vehicle. A second steering link 110 extends to pivot link 112 pivoted about a pivot point 114. A third steering link 116 extends from the pivot link 112 to the steering arm 28 associated with the right ski 20. Also coupled with the arcuate rack 104 is a fourth steering link 118 extending rearwardly to a pivot link 120. A last steering link 122 extends from the pivot link 120 which is pivotally mounted about pivot point 124 to the steering arm 96 associated with the steering ski 88. As the steering wheel is turned to the left, the arcuate rack 104 moves to the right as best seen in FIG. 2. This movement causes the skis 18 and 20 to pivot into a left turn while the steering ski 88 pivots in the opposite direction to assist in bringing the rear end of the vehicle about.

The location of the various components on the vehicle is best illustrated in FIG. 2. The engine 74 and drive train 76 are located at the rear of the vehicle in a central position. Two laterally adjacent seats 126 and 128 are located over the geometric intersection of two lines. Each line extends from the geometric center of one ski to the geometric center of one crawler track on the opposite side of the vehicle as viewed in plan. Forwardly of the seats 126 and 128 is a fuel tank 130 which is conveniently located below the floor board of the vehicle. Pedals 132 and a gear control 134 are positioned, as is the steering wheel 100, in appropriate association with one of the seats 126 and 128.

Thus, a controllable and stable moderate duty snow vehicle is disclosed. While embodiments and applications of this invention have been shown and described, it would be apparent to those skilled in the art that many more modifications are possible without departing from the inventive concepts herein. The invention, therefore is not to be restricted except in the spirit of the appended claims.

What is claimed is:

1. A snow vehicle comprising:
a frame
steerable ski means supporting the forward end of said frame;
two laterally spaced crawler tracks supporting the rear end of said frame;
a steering ski pivotally mounted to said frame laterally intermediate said crawler tracks.

2. The snow vehicle of claim 1 wherein said steerable ski means comprise two laterally spaced skis pivotally mounted to said frame for steering.

3. The snow vehicle of claim 2 further comprising steering linkage mounted to said frame and coupled with said two laterally spaced skis and said steering ski, said steering linkage being constructed and arranged to pivot all of said skis with said steering ski being pivoted in the opposite direction from said other two skis.

4. The snow vehicle of claim 1 wherein said steering ski is arranged to extend to a plane below that containing the underside of said crawler tracks.

5. The snow vehicle of claim 1 wherein the geometric center of said steering ski is disposed substantially at the geometric center of said crawler tracks in plan.

6. The snow vehicle of claim 2 in which said two laterally spaced skis and said crawler tracks are disposed in a substantially rectangular array and further comprising:
two seats positioned side by side on said frame and centered above the point of intersection of two lines, each line extending in plan from the geometric center of one of said skis to the geometric center of a said crawler track on the opposite side of said frame.

7. The snow vehicle of claim 6 further comprising:
an engine and drive train mounted to said frame behind said seats, said drive train extending to a position between said crawler tracks and being operatively coupled with each said crawler track.

8. The snow vehicle of claim 7 further comprising a fuel tank positioned forwardly of said seats.

9. The snow vehicle of claim 7 wherein said drive train includes a pair of oppositely extending axles rotatably driven by said engine, each said axle driving one of said crawler tracks, respectively, a fluid coupling operatively coupled with each of said axles, respectively, and a gear case positioned between and mounting said axles, said engine being coupled with said axles through said fluid couplings in said gear case.

10. A snow vehicle comprising:
a frame;
two laterally spaced skis supporting the forward end of said frame;
two laterally spaced crawler tracks supporting the rear end of said frame;
a steering ski pivotally mounted to said frame laterally intermediate said crawler tracks;
two seats positioned side by side on said frame and centered above the point of intersection of two lines, each line extending in plan from the geometric center of one of said laterally spaced skis to the geometric center of a crawler track on the opposite side of the frame; and
an engine and drive train mounted to said frame behind said seats, said drive train extending to a position between said crawler tracks and being operatively coupled with each said crawler track.

11. The snow vehicle of claim 10 further comprising a fuel tank positioned forwardly of said seats.

12. The snow vehicle of claim 10 wherein said drive train includes a pair of oppositely extending axles rotatably driven by said engine, each said axle driving one of said crawler tracks, respectively, a fluid coupling operatively coupled with each of said axles, respectively, and a gear case positioned between and mounting said axles, said engine being coupled with said axles through said fluid couplings in said gear case.

13. The snow vehicle of claim 10 wherein said two laterally spaced skis are pivotally mounted to said frame for steering.

14. The snow vehicle of claim 13 further comprising steering linkage mounted to said frame and coupled with said two laterally spaced skis and said steering ski, said steering linkage being constructed and arranged to pivot all of said skis with said steering ski being pivoted in the opposite direction from said other two skis.

15. The snow vehicle of claim 10 wherein said steering ski is arranged to extend to a plane below that containing the underside of said crawler tracks.

16. The snow vehicle of claim 10 wherein the geometric center of said steering ski is disposed substantially at the geometric center of said crawler tracks in plan.

17. A snow vehicle comprising:
a frame;
two laterally spaced skis supporting the forward end of said frame and being pivotally mounted thereto for steering;
to laterally spaced crawler tracks, each being substantially rearwardly aligned with one of said laterally spaced skis supporting the rear end of said frame;
a steering ski pivotally mounted to said frame laterally intermediate said crawler tracks, said steering ski being arranged to extend to a plane below that containing the underside of said crawler tracks and having its geometric center disposed substantially at the geometric center of said crawler tracks in plan; and
steering linkage mounted to said frame and coupled with said two laterally spaced skis and said steering ski, said steering linkage being constructed and arranged to pivot said steering ski in the opposite direction from said two laterally spaced skis.

18. The snow vehicle of any one of claims 1, 10 or 17 in which said frame includes a suspension assembly structure for mounting each of said crawler tracks; and said steering ski being pivotally mounted to said suspension assembly structure.

* * * * *